Aug. 27, 1929.                H. C. PIPHER                1,726,238
                              HOSE COUPLING
                            Filed Feb. 15, 1928

INVENTOR.
Homer C. Pipher
BY
Townsend, Loftus & Abbett
ATTORNEYS.

Patented Aug. 27, 1929.

1,726,238

UNITED STATES PATENT OFFICE.

HOMER C. PIPHER, OF OAKLAND, CALIFORNIA.

HOSE COUPLING.

Application filed February 15, 1928. Serial No. 254,404.

This invention relates to hose couplings and has for its principal object the provision of a simple and inexpensive device of the character referred to which may be easily, firmly and tightly connected with the end of a hose.

In carrying out the invention into practice, I provide a tubular shank having a coupling member arranged at one end thereof and an outwardly tapered member at the other end. This latter member is adapted to be inserted into the end of a hose. Cooperating with this outwardly tapered member is a clamp collar formed with a bore larger than but similar to the outwardly tapered member so that it may be forced thereover to clamp the hose thereto. As this clamp collar is moved outwardly on the outwardly tapered member, the distance between its bore and the surface of said tapered member will decrease so as to compress the hose therebetween. Therefore, any tendency to disengage the hose from the shank without first removing the clamp collar will tend to more tightly clamp the hose to the shank.

One form which the invention may assume is exemplified in the following description and illustrated by way of example in the accompanying drawings, in which.

Figure 1:
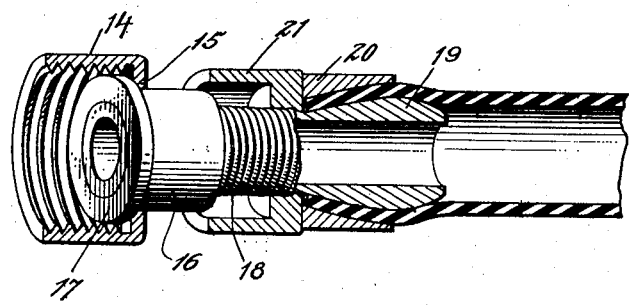
Fig. 1 is a perspective view of a device embodying the preferred form of my invention as connected with the end of a hose and with parts thereof in central longitudinal section to more fully disclose its construction.

Referring more particularly to the accompanying drawings, 10 indicates a hose coupling comprising a female coupling member 11 interiorly threaded to receive a male coupling member 12. The coupling member 11 consists of a hollow interiorly threaded cylindrical collar 14 having an inturned flange 15 at one end thereof. This collar 14 is arranged loosely on a tubular connector 16. This latter is formed with a radially circumscribing flange 17 against which the flange 15 of the collar is adapted to abut. When the collar 14 is threaded on the male coupling member 12, it revolves about the connector 16 and its flange 15 engages with the flange 17 on the connector 16 and draws the end of the latter tightly into engagement with the contiguous end of the coupling member 12. If desired a gasket may be interposed between the ends of the coupling members when they are connected together.

The connector 16 is tapped and is threaded on the threaded end of a tubular shank 18. The other end of the shank is formed with a portion 19 which flares or tapers outwardly for a major portion of its length. The outermost extremity of this portion or member 19 of the shank is rounded, so that it may be inserted in the end of a hose. The larger diameter of the outwardly tapered portion or member 19 of the shank 18 is slightly larger than the interior diameter of the hose, so that the latter will fit tightly thereover.

Loosely arranged over the shank 18 is a cylindrical clamp collar 20 having a tapered bore similar to the tapered portion 19 of the shank. The bore of the clamp collar, however, is somewhat larger than the portion 19 so that it will fit over the end of the hose arranged on the portion 19. The diameter of the bore of the clamp collar 20 is such that after it is tightly arranged on the end of the hose and over the portion 19 of the shank, an attempt to disengage the hose and shank by exerting a pull on the hose will result in a greater clamping action. This is because the space between the bore of the clamp collar 20 and the surface of the portion 19 of the shank decreases as the collar moves outwardly relative to the portion 19. Therefore, any attempt to disengage the hose from the coupling by exerting a pull on the hose will tend to move the collar 20 outwardly on the shank 18 and result in an increased clamping action.

To initially position the collar 20 to clamp the hose on the portion 19 of the shank, I provide a nut 21 threaded on the shank intermediate the clamp collar 20 and the coupling member 11. This nut 21 may be threaded along the threaded portion of the shank after the hose is arranged on the portion 19 of the shank to force the clamp collar tightly over the hose and clamp it to the shank. It will be noticed that the nut 21 is counterbored at one end to enable it to telescope over the adjacent end of the coupling member 16. This is necessary when it is desired to connect or disconnect the coupling from the hose without the necessity of removing the coupling. It also provides protection for the exposed threads when the parts are in clamping position.

It is seen from the drawings that the coupling 11 may be removed from the shank as the connector 16 is threaded thereon. This will permit the shank and hose to be connected directly to a pipe if desired.

Figure 2:
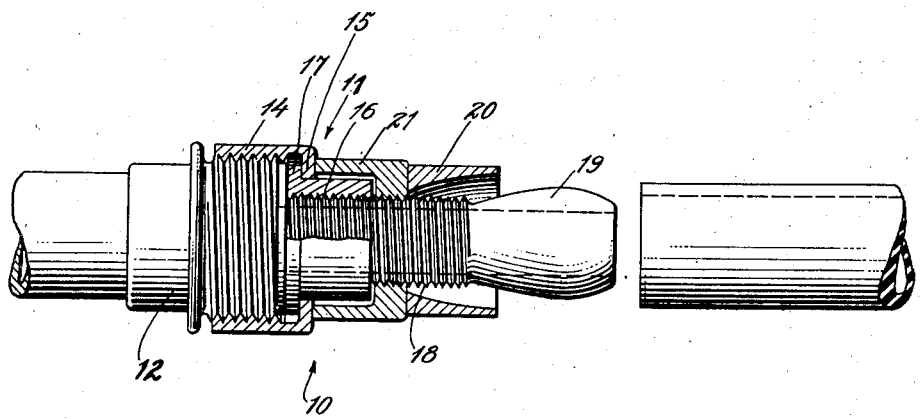
Fig. 2 is a view in central longitudinal section through the device disclosing the shank in full and the manner in which the parts are arranged when the device is to be connected to a hose.

In operation of the device, the parts thereof are constructed as illustrated and described, and arranged as shown in Fig. 2. The portion 19 of the shank is then inserted in the end of the hose and the clamp collar 20 is forced over the hose by means of the nut 21 until a clamping action is obtained, clamping the hose firmly to the portion 19 of the shank. The device is then ready for use.

If it is desired to connect the hose to a pipe line, it is only necessary to remove the coupling member 11 therefrom and the shank may then be directly connected to a pipe line.

From the foregoing it is obvious that I have provided a very simple and inexpensive device which will firmly and tightly connect a coupling with the end of a hose.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A device of the character described comprising a tubular shank, one end of said shank being threaded, a coupling threaded on to said threaded end of the shank, the other end of the shank being outwardly tapered to a diameter slightly larger than the interior diameter of the hose, a cylindrical clamp collar arranged over the shank formed with a bore larger in diameter than the diameter of the tapered end of the shank, said bore being tapered similar to the taper of said tapered end of the shank whereby said clamp collar may be arranged over the end of the hose mounted on said tapered end of the shank whereby outward movement of the collar relative to said tapered end of the shank will result in a clamping action therebetween, and a nut threaded on the shank intermediate the coupling and the tapered end to force said clamp collar outwardly relative to the tapered end of the shank, said nut being counterbored at one end to enable it to be telescoped over the adjacent end of the coupling member.

HOMER C. PIPHER.